US012478117B2

(12) United States Patent
Dratva

(10) Patent No.: US 12,478,117 B2
(45) Date of Patent: Nov. 25, 2025

(54) METHOD FOR MAKING A SHIELDING GARMENT FOR A HUMAN BODY

(71) Applicant: Christian Dratva, Zurich (CH)

(72) Inventor: Christian Dratva, Zurich (CH)

(*) Notice: Subject to any disclaimer, the term of this patent is extended or adjusted under 35 U.S.C. 154(b) by 91 days.

(21) Appl. No.: 18/484,841

(22) Filed: Oct. 11, 2023

(65) Prior Publication Data
US 2024/0065348 A1 Feb. 29, 2024

Related U.S. Application Data

(62) Division of application No. 15/762,620, filed as application No. PCT/EP2016/072669 on Sep. 23, 2016, now abandoned.

(30) Foreign Application Priority Data

Sep. 25, 2015 (CH) .................................. 1425/15

(51) Int. Cl.
A41D 13/008 (2006.01)
A41D 31/26 (2019.01)
(Continued)

(52) U.S. Cl.
CPC ........... A41D 13/008 (2013.01); A41D 31/26 (2019.02); B32B 5/26 (2013.01); D02G 3/441 (2013.01);
(Continued)

(58) Field of Classification Search
CPC .... A41D 13/008; A41D 31/26; A41D 31/265; B32B 5/26; D02G 3/441; H05K 9/009
See application file for complete search history.

(56) References Cited

U.S. PATENT DOCUMENTS 4,546,497 A * 10/1985 Ono ..................... A41D 13/008
139/420 R
5,103,504 A * 4/1992 Dordevic ............. A41D 13/008
2/457
(Continued)

FOREIGN PATENT DOCUMENTS

CN 2450916 Y 10/2001
CN 104172677 A 12/2014
(Continued)

OTHER PUBLICATIONS

Machine Translation of CN 104172677 (Year: 2014).
(Continued)

Primary Examiner — Uyen T Nguyen
(74) Attorney, Agent, or Firm — Brian Roffe

(57) ABSTRACT

Method for making a garment from sections having a first ply including fabric of threads, filaments or yarns that are each coated with a surface layer of silver or aluminum to form metal-coated threads, filaments or yarns, and at least one protective layer over each metal-coated thread, filament or yarn, a second ply adjacent the first ply and made of different material than the first ply, and a third ply adjacent the second ply such that the first ply is between the second and third plies and which third ply includes cloth fabric. The sections are connected together at seams formed by an edge of adjacent pairs thereof with the second ply of each section overlapping at the seams. The surface layer of silver or aluminum of the metal-coated threads, filaments or yarns is formed relative to properties of the metal-coated threads, filaments or yarns.

20 Claims, 2 Drawing Sheets

(51) Int. Cl.
*B32B 5/26* (2006.01)
*D02G 3/44* (2006.01)
*H05K 9/00* (2006.01)

(52) U.S. Cl.
CPC ........ *H05K 9/009* (2013.01); *B32B 2262/103* (2013.01); *B32B 2307/212* (2013.01); *B32B 2437/00* (2013.01)

(56) References Cited

U.S. PATENT DOCUMENTS

| | | | |
|---|---|---|---|
| 5,658,510 | A | 8/1997 | Carraro et al. |
| 5,968,854 | A | 10/1999 | Akopian et al. |
| 6,665,877 | B1* | 12/2003 | Gray ............... A41D 31/26 2/400 |
| 10,624,249 | B1 | 4/2020 | Zemberyova |
| 2003/0010939 | A1* | 1/2003 | DeMeo ............... G21F 3/02 250/516.1 |
| 2003/0170453 | A1 | 9/2003 | Foss et al. |
| 2004/0121678 | A1 | 6/2004 | Baldwin, Jr. et al. |
| 2010/0083429 | A1* | 4/2010 | Carraro ............... A41D 13/02 2/456 |
| 2011/0214221 | A1* | 9/2011 | Munda ............... A63B 71/141 2/161.1 |
| 2012/0042817 | A1 | 2/2012 | Goodwin |
| 2015/0061914 | A1 | 3/2015 | Falken et al. |
| 2018/0263302 | A1 | 9/2018 | Dratva |
| 2022/0136141 | A1 | 5/2022 | Cowan |

FOREIGN PATENT DOCUMENTS

| | | |
|---|---|---|
| DE | 29921905 U1 | 3/2000 |
| WO | 02064207 A1 | 8/2002 |
| WO | 2008012518 A1 | 1/2008 |
| WO | 2017050957 A1 | 3/2017 |

OTHER PUBLICATIONS

Machine Translation of DE 20102560 (Year: 2001).
Abstract of WO 02064207.
Machine Translation of CN 2450916Y (Year: 2001).

* cited by examiner

METHOD FOR MAKING A SHIELDING GARMENT FOR A HUMAN BODY

CROSS-REFERENCE TO RELATED APPLICATION

This application is a divisional of U.S. patent application Ser. No. 15/762,620 filed Mar. 23, 2018, the disclosure of which is incorporated by reference herein.

FIELD OF THE INVENTION

The invention relates to a garment, in particular for a human body, which is composed of several sections that are connected together and are each made of one or more plies.

The present invention also relates to a method for making a garment, in particular for a human body, which is composed of several sections that are connected together and are each made of one or more plies.

BACKGROUND OF THE INVENTION

It is known that there is ever more impact upon the environment due to the electromagnetic radiation waves which occur increasingly frequently and with greater intensity, which radiation waves have to be generated for the transmission of signals for mobile telephones, wireless devices, radio telephones etc.

As one possibility for providing protection against this electric smog, cloth fabrics are known with thin conductive wires made of silver, copper or steel which are spun into threads. However, a disadvantage of this type is that when such cloth fabrics are used in clothes with an increasing service life, the wires may break due to continuous wearing and washing. Corrosion is also generated here by washing and by perspiration, and this may result in weak points and once again in premature breakage of the wire filaments. Consequently, any protective effect against electric smog is largely lost, and in addition the broken, small, thin wire tips may cause at the very least unpleasant irritation points when they come into contact with the skin. With these metal wires the garments are very prone to creasing because the wires are plastically deformed when the material is bent.

When using steel as the wire, it is generally produced from stainless steel which contains nickel and zinc. When wearing garments with this type of fabric, this often results in skin allergies. A similar thing happens when copper is used.

Another disadvantage of these materials arises due to the effect of the wires upon the skin due to the high-frequency waves. The depth of the material used can be calculated from the respective frequency of the waves that occur, the conductivity of the shielding material that is used and the vacuum permeability. The material beneath the penetration depth of the waves does not contribute to the shielding and is therefore useless. For this reason, the wire shielding is considerably poorer at higher frequencies, such as for example 5.6 GHz, which the new Wi-Fi routers use, than at 1 GHz.

OBJECTS AND SUMMARY OF THE INVENTION

In contrast, the object of the present invention is to devise a garment and method for making the same by means of which in particular at least certain parts of the human body are largely protected against electromagnetic radiation, and this garment is comfortable to wear and has a sufficient service life.

According to the invention, this object is achieved by a method for making a garment in which a plurality of sections having edges are provided, with each section including a first ply having fabric including threads, filaments or yarns that are each coated with a surface layer of silver or aluminum to form metal-coated threads, filaments or yarns, and at least one protective layer over each of the metal-coated threads, filaments or yarns, a second ply adjacent the first ply and which is made of different material than the first ply, and a third ply adjacent the second ply such that the first ply is between the second and third plies with the third ply including cloth fabric. The sections are connected together at a plurality of seams. Each seam is formed by an edge of a first one of an adjacent pair of the sections and an edge of a second one of the adjacent pair of the sections. The second ply of each section overlaps at the seams.

Also in the method, the surface layer of silver or aluminum of the metal-coated threads, filaments or yarns is formed relative to properties, e.g., dimensions, of the metal-coated threads, filaments or yarns, i.e., different dimensions of the metal-coated threads, filaments or yarns results in different surface layers of silver or aluminum. As such, shielding of the human body from electromagnetic radiation waves when the garment is on the human is varied based on the properties, e.g., dimensions, of the metal-coated threads, filaments or yarns and formation of the surface layer of silver or aluminum of the metal-coated threads, filaments or yarns based thereon.

Since a fabric is respectively used for at least one ply of at least one specific section, by means of which shielding from electromagnetic radiation of, in particular, the human body is achieved, this type of garment by the method according to the invention offers maximum protection against electric smog and is nevertheless pleasant to wear, and it can also be cleaned like conventional laundry.

Very advantageously, this at least one ply with this shielding protective effect is produced from a fabric made of metal-coated threads, filaments and/or yarns, silver or aluminum or alloys thereof advantageously being used as the metal. With silver, one also has the additional advantage of an anti-bacterial effect due to very large silver surface areas.

By taking this measure, the best results are achieved for shielding the human body from the electromagnetic fields that occur increasingly frequently and with greater intensity, in particular in the high-frequency range.

As another embodiment according to the invention, these threads, filaments and/or yarns of the fabric provided with a surface layer of metal are coated with an outer protective layer of a preferably elastic plastic. These metal coatings are thus additionally protected against abrasion and oxidation.

Further advantageous details of this garment within the framework of the invention are defined in the dependent claims.

BRIEF DESCRIPTION OF THE DRAWINGS

Exemplary embodiments of the invention and further advantages of the same are explained in more detail below with reference to the drawings. These show as follows.

DETAILED DESCRIPTION OF THE INVENTION

Figure 1:
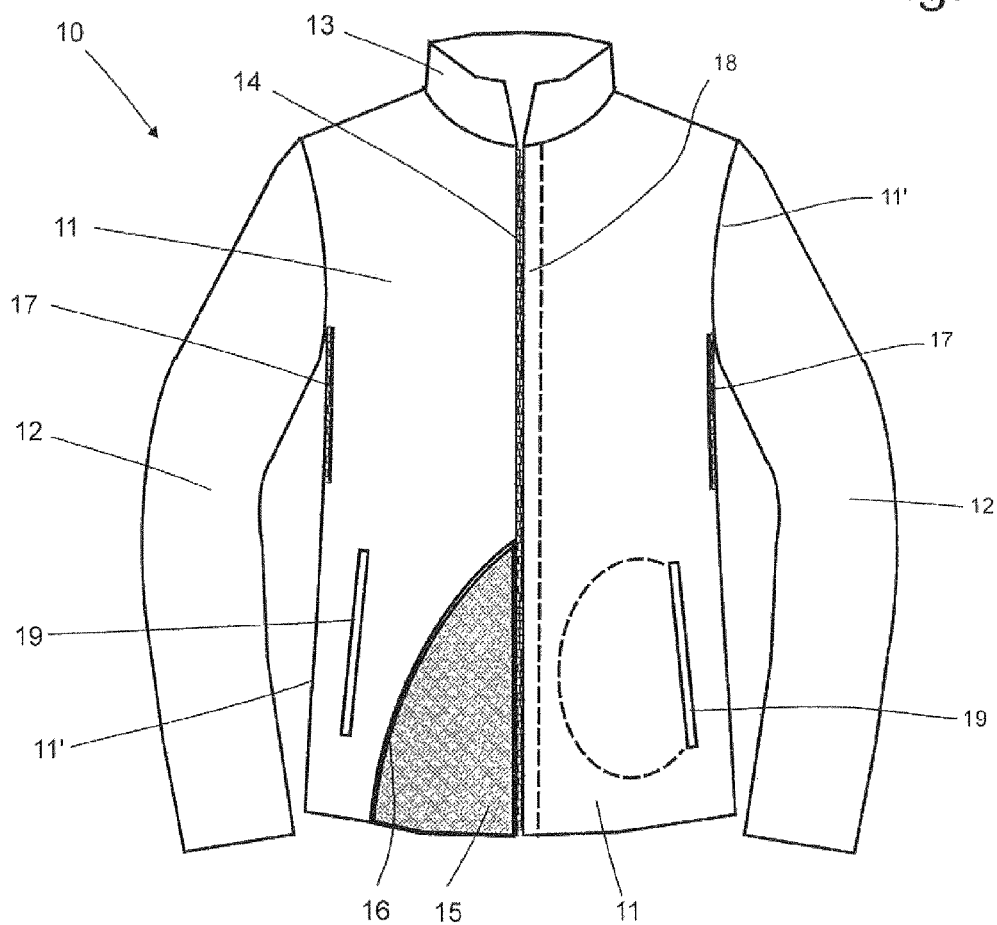
FIG. 1 is a schematic view of a jacket with a section of the outer ply that is made by a method in accordance with the invention.

FIG. 1 shows a jacket 10 as a garment for a human body which can be provided for a female or a male person that is made by a method in accordance with the invention. Needless to say, such garments are suitable for adults, children or also for babies.

This jacket 10 is made up of several sections 11, 12, 13 that are connected together and are each made of two plies. Jacket 10 can be closed, for example, by a zip fastener 14, as shown, or it can accordingly be opened by the zip fastener 14. Furthermore, zip fasteners 17 are indicated beneath the sleeves, which zip fasteners 17 can be opened so as to enable cooling within the jacket 10. The shielding material is maintained beneath such ventilating zip fasteners 14, 17, and so is protective.

According to the invention, the inner ply 15, which does not lie directly against the skin of the human body in a jacket 10, is formed from this fabric which shields the human body on which the jacket 10 is worn from electromagnetic radiation and on the outside from at least one ply 16 made of a cloth fabric and/or a moisture or wind-impermeable plastic layer. The at least one ply 16 over the inner ply 15 may also be a layer that specifically repels rain or water.

Advantageously, the inner ply 15 extends over the entire inner surface of the jacket 10, i.e., over the front side 11, the non-visible rear side, at the top on the collar and on the sleeves 12. In addition, these inner plies 15 are arranged so as to overlap on the seams 11' at the cross-over from the front 11 to the rear side. Along the zip fastener 14 too, a strip 18 covering the latter on the inside is connected to one section 11 which is also provided with a shielding inner ply 15 so that absolute tightness is also provided on this zip fastener 14.

Moreover, conventional pockets 19 are provided on the front sections 11 of the jacket 10. Advantageously, shielding fabric is not assigned to each of the outer wall sections so that if a mobile telephone is placed therein, the mobile telephone is connected to the network and calls can be received, but protection against the rays is advantageously provided towards the body by a double ply.

Moreover, the jacket 10 could also be equipped with a hood (not shown) which would also advantageously be provided with an inner ply 15 as part of the shielding fabric. In addition, an inner liner, for example made of wool, could also be sewn into this hood, but also into the inside of the jacket 10, which could serve the purpose of providing insulation against the cold, touch comfort or a moisture management function.

This inner ply 15 of the fabric that provides shielding from the electric smog is advantageously tightly woven or knitted from metal-coated yarns (threads or filaments) such that the light meshes are reduced from 4 mm to almost zero so that almost 100% impermeability to electromagnetic waves is achieved.

The yarns are provided here with a thin surface layer made of metal, preferably silver or aluminum, by means of which electrical conductivity is provided, by means of which shielding from electromagnetic waves up to a frequency range of 0.8 to 15 GHz is guaranteed.

As another embodiment within the framework of the invention, the yarns of the shielding fabric provided with a surface layer made of metal, i.e., the metal-coated threads, filaments or yarns, could then be coated with an outer protective layer made of a preferably elastic plastic.

This outer protective layer is preferably provided so that if there is corrosion of the metal during use, no or only a slight color change of the at least one section 11, 12, 13 takes place.

Furthermore, the protective layer protects against mechanical wear, extreme bending or alternating bending of the filaments or yarns. The protective layer therefore results in a greatly longer service life of the materials. In addition, the production costs for the materials are reduced because one only needs to apply the minimally required coating thickness. With the metallization and the choice of metal, the color of the material is automatically retained. With the additional protective layer one can add color pigments, and so change the color of the material, and this makes things easier when designing the garment. Due to the metal base, the colors will appear to be far lighter and clearer than, for example, with normally dyed nylon material. If tiny particles of silver are added in addition to the color pigments, one will obtain this antibacterial surface.

Figure 2:
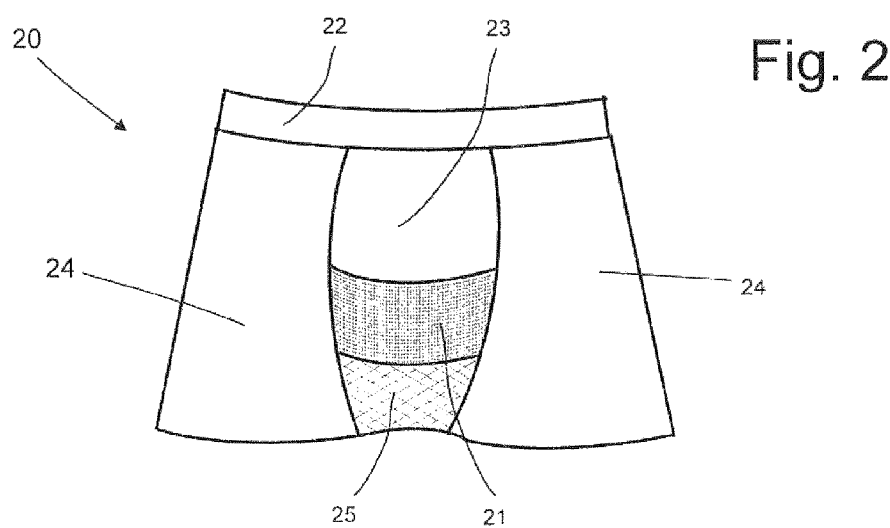
FIG. 2 is a schematic view of an under-garment with a section of the outer and the middle ply that is made by a method in accordance with the invention.

According to FIG. 2, a pair of underpants 20 is illustrated as a garment. According to the invention, these are made in three layers with an inner ply 21 with a cloth fabric, above this with a ply 25 made of the fabric coated with metal, and on the outside with a ply 23 made of a conventional fabric, as is illustrated by the section. At least in the genital area, these three plies are arranged as shown. In principle, the underpants 20 could be provided overall with these three plies or they could also be produced entirely from the protective ply 25.

These several sections 22, 23, 24 with, in each case, several plies are stitched or adhered to one another depending on what materials are used. They are stitched or adhered or connected to one another in some other way so that the garment behaves like a single-ply garment. In order to achieve this, the elasticity and the thickness must be taken into account in the sewing design of the cutting pattern.

Figure 3:
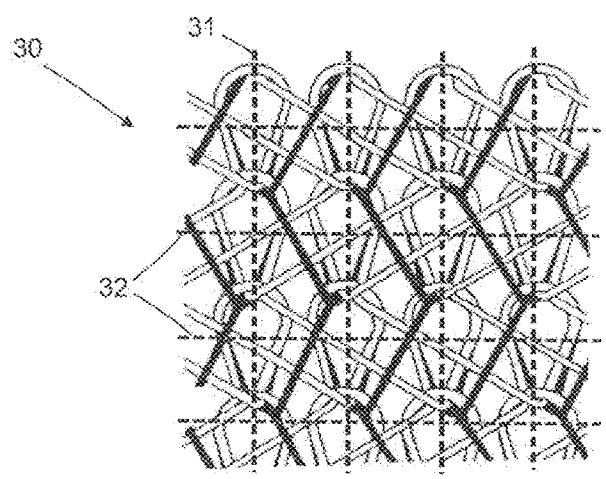
FIG. 3 is a view of an enlarged portion of a version of a knitted fabric according to the invention with integrated filaments.
Figure 4:
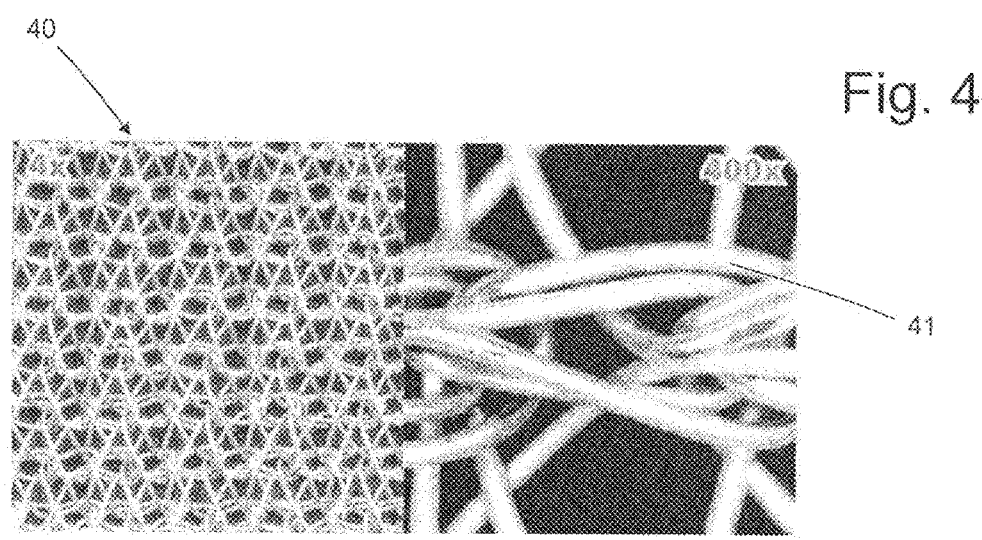
FIG. 4 are views of, in each case, a portion of a knitted fabric according to the invention with 4 or 400-times enlargement.

FIG. 3 and FIG. 4 each show a portion of a knitted fabric 30, 40. In the knitted fabric 30, filaments 31, 32 arranged parallel to one another are integrated with a horizontal and vertical alignment. This enables problem-free conveyance and shielding of the electromagnetic radiating waves.

In the knitted fabric 40 according to FIG. 4, the filaments 41 are illustrated with the metal layer and a transparent outer protective layer, within the framework of the invention these filaments 41 being able to be bent around very narrow radii without the metal layer thus being torn.

In order to ensure sufficient conductivity and so the electromagnetic protective effect when using outer protective layers over the metal layers of the filaments, the sections can be connected to one another by sufficient overlapping of their edges or also by forming contact of the conductive layers on these edges.

This can also take place by fusing the outer protective layers, for example by means of a hot-pressing roller or an ultrasonic pressing roller. By means of the contact pressure applied by the roller to the edges of the sections, at the same time adhesion of the latter to one another can be generated.

This is implemented such that the filaments, and so the metal layers of the two sections, touch, and so shielding is also guaranteed at these cross-over points of the sections.

When producing the coating with the metal, for example of the fabric of the ply 25, provision is made within the framework of the invention such that the surface resistance of this fabric exceeds no more than 2 Ohms/m² so that sufficient shielding is guaranteed, but no unnecessary over-thickening of the layer has to be produced. That is, the layer or coating or metal on the threads, filaments or yarns is designed relative to properties, e.g., dimensions, of the metal-coated threads to obtain desired surface resistance (e.g., a maximum limit) without unnecessarily thickening the layer or coating or metal (and wasting material and increasing the weight of the garment). In view of this design, shielding of the human body from electromagnetic radiation waves when the garment is on the human is varied based on the properties of the metal-coated threads, filaments or yarns and formation of the surface layer of silver or aluminum of the metal-coated threads, filaments or yarns based thereon.

With this, the surface resistance $\rho_o$ in Ohms/m², which determines the conduction behavior of thin layers, which are the same or very similar in the vertical and the horizontal direction, can be calculated by the following formula (in which variable are of properties of the metal-coated filaments, threads or yarns, such as dimensions thereof):

$$\rho_o = \rho_s A / \pi D \, s$$

the individual values being defined as follows:

$\rho_s$ describes the material purely with Ohm/m or the resistance per meter length of a filament, A is the distance in meters between the threads, filaments or yarns which run parallel to one another in the transverse or longitudinal direction, D is the diameter in meters of an outer surface of each metal-coated thread, filament or yarn without an additional protective layer; and s is the layer thickness in meters of the metal of the individual threads, filaments or yarns which are smaller than or equal to the skin effect depth at the frequency being considered.

Thus, the surface resistance for the fabric to be used for the ply 25 can be established and can be appropriately interpreted for a specific application. It can be seen that the surface resistance is based partly on three properties of the metal-coated threads, filaments or yarns, namely, the distance between the threads, filaments or yarns which run parallel to one another in the transverse or longitudinal direction, the outside diameter of the metal-coated threads, filaments or yarns without an additional protective layer, and the thickness of the metal layer or coating of the individual threads, filaments or yarns. The specific application is set and then the surface layer of silver or aluminum of the metal-coated threads, filaments or yarns formed relative to properties of the metal-coated threads, filaments or yarns selected for use in the application. Different metal-coated threads, filaments or yarns will result in different surface layers of silver or aluminum based on the above formula.

Moreover, the minimum dimension for the layer thickness d of the metal can be calculated for specific frequencies. The skin effect of the conductive material can be taken into account here depending on the application. At a frequency of 1 GHz for pure aluminum metallization of a filament a skin depth of 8.3 μm is produced, and at a frequency of 6 GHz a skin depth of 3.4 μm. It is thus demonstrated that the wires are far too big for the use of microwave shields.

A specific amount of carbon particles or similar can be contained in the plastic material of the protective layer as semi-conductive material, by means of which an electrical conductivity can be generated. The garment 10 can thus be provided with an antistatic effect. With silver particles, one would achieve the same effect as with carbon, but there would be an even greater antibacterial effect upon the surface. Another design of the protective layer could also be made of the known material composed of conductive polymers which do not require any filler particles for conductivity.

When using such semi-conductive particles in the protective layer, at the contact points of the filaments or the like, electrons can be exchanged between the latter when electromagnetic radiation occurs. In order to approximately determine the conductivity of this type of protective layer, one can base this on a calculation of the number of contacts per surface area.

When integrating pigments into the plastic material of the protective layer, such as for example carbon lamella particles in an amount such that the distance between the lamellae is very small, a reduced conductivity can be achieved, while with mutual touching of these lamellae, the conductivity is increased.

The shielding behavior (Transmission T, Reflexion R, Absorption A, Transmission TdB relative to intensity) of materials with insulated contact between the filaments relative to the actual area conductance value taking into account the skin depth for the respective frequency is shown in FIG. 5 of U.S. Patent Application Publication No. 20180263302, which is the publication of U.S. patent application Ser. No. 15/762,620 filed Mar. 23, 2018, now abandoned. From this diagram, one can deduce that if one increases the surface resistance from one to two Ohms/m², taking into account the possible utilization of the conductive cross-section based on the skin effect depth, the shielding is not doubled, but rather the damping increases by 10 dB.

The reason for the better shielding of the metal-coated filament with the same or a lower portion of metal per material is based on the shielding fabric mostly consisting to a large extent of the metal-coated filaments. If the effect of the skin effect is additionally taken into account, more conductive material is available at high frequencies, and this results in better shielding. For this reason, the metallization is also over-thickened here in order to achieve a longer service life.

Needless to say, the invention can be applied to a wide variety of versions of garments for adults as well as for the smallest of children, and also to a wide variety of fabric types which are also, for example, crease-free or self-ironing.

In the broadest sense of the invention, a duvet cover, a bed canopy or the like, in which in each case at least one ply is integrated with the fabric, by means of which shielding from electromagnetic radiation of in particular the human body, could also be understood to be garments.

In principle, threads, filaments or yarns, which are produced at least partially from metal wires and/or from materials containing carbon or other electrically conductive materials, could also be used.

It is also conceivable for the sections of a garment to be produced with a fine-mesh net made of very thin metallized filaments adhered to the fabric in order to achieve the shielding effect.

In the method for forming a garment, the forming of the surface layer of silver or aluminum of the metal-coated threads, filaments or yarns relative to properties of the metal-coated threads, filaments or yarns mentioned above can entail considering conduction behavior of the surface layer of the silver or aluminum based on a surface resistance (ρo) in Ohms/m² according to the formula set forth above, and/or selecting the properties of the surface layer of silver or aluminum of the metal-coated threads, filaments or yarns such that surface resistance of the fabric of the first ply does not exceed 2 Ohms/m².

Each protective layer can include plastic material that includes conductive material such that each metal-coated thread, filament or yarn has a respective coating of silver or aluminum and a respective coating of plastic material over the coating of silver or aluminum. Also, each protective layer of plastic material around the metal-coated threads, filaments or yarns in each of the sections may be in contact with and/or fused to a protective layer of plastic material around the metal-coated threads, filaments or yarns in another of the sections connected together at the seams.

In one embodiment, the sections are formed such that the fabric of the first ply is without light meshes between the metal-coated threads, filaments or yarns resulting from knitting or weaving of the metal-coated threads, filaments or yarns. Color pigments may be added to each protective layer to provide the first ply with color. The sections may be connected together at the seams by connecting the edges of all of the sections together by stitches or adhesive at the seams and to overlap at the seams such that gap-free shielding is provided.

In one embodiment, the first ply of adjacent pairs of sections are stitched together such that metal-coated threads, filaments or yarns are continuous throughout the garment. The surface layer of silver or aluminum around the threads, filaments or yarns in each section may be in contact with the surface layer of silver or aluminum around the threads, filaments or yarns in another section connected together at the seams.

In one embodiment, an adjacent pair of the sections are connected together connecting using a zip fastener. The zip fastener has a first state in which the adjacent pair of the sections is together and a second state in which the adjacent pair of the sections are separated from one another by the zip fastener. A shielding strip is positioned on an inside-facing side of a portion of only one of the adjacent pair of the sections alongside the zip fastener to cover the zip fastener from an outside and from only one side. The shielding strip includes an inner ply having fabric including threads, filaments or yarns that are coated with metal to form metal-coated threads, filaments or yarns. The metal-coated threads, filaments or yarns provide shielding from electromagnetic radiation waves.

Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

The invention claimed is:

1. A method for making a garment, comprising:
   providing a plurality of sections having edges, each of the sections comprising:
      a first ply comprising fabric including metal and plastic-coated threads, filaments or yarns, each of the metal and plastic-coated threads, filaments or yarns having a surface layer of silver or aluminum forming a coating of silver or aluminum and a coating of plastic material that includes conductive material over the coating of silver or aluminum such that each of the threads, filaments or yarns has a respective coating of silver or aluminum and a respective coating of plastic material that includes conductive material over the coating of silver or aluminum;
      a second ply adjacent the first ply, the second ply being made of different material than the first ply; and
      a third ply adjacent the first ply such that the first ply is between the second and third plies, the third ply comprising cloth fabric;
   connecting the sections together at a plurality of seams, each of the seams being formed by an edge of a first one of an adjacent pair of the sections and an edge of a second one of the adjacent pair of the sections, the second ply of each of the sections overlapping at the seams; and
   forming the surface layer of silver or aluminum of the metal and plastic-coated threads, filaments or yarns relative to properties of the metal and plastic-coated threads, filaments or yarns,
   the step of connecting the sections together at the plurality of seams comprising stitching the first ply of the first one of the adjacent pair of the sections to the first ply of the second one of the adjacent pair of the sections such that metal and plastic-coated threads, filaments or yarns are continuous throughout the garment,
   whereby shielding of the human body from electromagnetic radiation waves when the garment is on the human is based on properties of the metal and plastic-coated threads, filaments or yarns and formation of the surface layer of silver or aluminum of the metal and plastic-coated threads, filaments or yarns based thereon.

2. The method of claim 1, wherein the step of forming the surface layer of silver or aluminum of the metal and plastic-coated threads, filaments or yarns relative to properties of the metal and plastic-coated threads, filaments or yarns comprises determining characteristics of the silver or aluminum of the metal and plastic-coated threads, filaments or yarns in view of conduction behavior of the surface layer of the silver or aluminum of the metal and plastic-coated threads, filaments or yarns.

3. The method of claim 2, wherein the characteristics of the silver or aluminum of the metal and plastic-coated the threads, filaments or yarns are determined in view of conduction behavior of the surface layer of the silver or aluminum of the metal and plastic-coated threads, filaments or yarns based on a surface resistance ($\rho_o$) in Ohms/square meter according to the following formula:

$$\rho_o = \rho_s \, A/\pi D \, s$$

wherein:
$\rho_s$ is material purely with Ohm/m or resistance per meter length of one of the metal and plastic-coated threads, filaments or yarns,
A is a distance in meters between an adjacent pair of the metal and plastic-coated threads, filaments or yarns which run parallel to one another in a transverse or longitudinal direction,
D is a diameter in meters of an outer surface of each of the metal and plastic-coated threads, filaments or yarns without the respective coating of plastic material that includes conductive material, and s is a thickness in meters of the surface layer of silver or aluminum of each individual one of the metal and plastic-coated threads, filaments or yarns.

4. The method of claim 1, wherein the step of forming the surface layer of silver or aluminum of the metal and plastic-coated threads, filaments or yarns relative to properties of the metal and plastic-coated threads, filaments or yarns comprises forming the surface layer of silver or aluminum of the metal and plastic-coated threads, filaments or yarns relative to at least one dimension of the metal and plastic-coated threads, filaments or yarns.

5. The method of claim 1, wherein the step of forming the surface layer of silver or aluminum of the metal and plastic-coated threads, filaments or yarns relative to properties of the metal and plastic-coated threads, filaments or yarns comprises selecting the properties of the surface layer of silver or aluminum of the metal and plastic-coated threads, filaments or yarns such that surface resistance of the fabric of the first ply does not exceed 2 Ohms/square meter.

6. The method of claim 1, further comprising arranging the sections to form a jacket when connected together.

7. The method of claim 6, wherein the step of arranging the sections to form a jacket when connected together comprises designating sections to define a front side of the garment, a rear side of the garment and sleeves on opposite lateral sides of the garment.

8. The method of claim 7, wherein the second ply extends over the entire inner surface of the garment including over the front side, the rear side and the sleeves.

9. The method of claim 1, further comprising forming the sections such that the fabric of the first ply is without light meshes between the metal and plastic-coated threads, filaments or yarns resulting from knitting or weaving of the metal and plastic-coated threads, filaments or yarns.

10. The method of claim 1, further comprising adding color pigments to the coating of plastic material that includes conductive material to provide the first ply with color.

11. The method of claim 1, wherein the step of connecting the sections together at a plurality of seams comprises connecting the edges of all of the sections together by stitches or adhesive at the seams and to overlap at the seams such that gap-free shielding is provided.

12. The method of claim 1, wherein the coating of plastic material that includes conductive material in each of the sections is in contact with the coating of plastic material that includes conductive material in another of the sections connected together at the seams.

13. The method of claim 1, wherein the coating of plastic material that includes conductive material in each of the sections is fused to the coating of plastic material that includes conductive material in another of the sections connected together at the seams to thereby provide the contact therebetween.

14. The method of claim 1, further comprising:
connecting, using a zip fastener, an adjacent pair of the sections together, the zip fastener having a first state in which the adjacent pair of the sections is together and a second state in which the adjacent pair of the sections are separated from one another by the zip fastener; and
positioning a shielding strip on an inside-facing side of a portion of only one of the adjacent pair of the sections alongside the zip fastener to cover the zip fastener from an outside and from only one side, the shielding strip including an inner ply comprising fabric including threads, filaments or yarns that are coated with metal to form metal-coated threads, filaments or yarns, the metal-coated threads, filaments or yarns of the inner ply of the shielding strip providing shielding from electromagnetic radiation waves.

15. The method of claim 1, wherein the threads, filaments or yarns are each coated with a surface layer of silver.

16. The method of claim 1, wherein the threads, filaments or yarns are each coated with a surface layer of aluminum.

17. The method of claim 1, further comprising configuring the sections such that the third ply is an outermost ply of the garment.

18. The method of claim 1, wherein the step of connecting the sections together at the plurality of seams further comprises providing that the coating of plastic material around the metal and plastic-coated threads, filaments or yarns in each of the connected sections is in contact with the coating of plastic material around the metal and plastic-coated threads, filaments or yarns in another of the connected sections connected together at the seams.

19. The method of claim 1, wherein the conductive material in the coating of plastic material comprises carbon particles.

20. The method of claim 1, wherein the conductive material in the coating of plastic material comprises silver particles.

* * * * *